US005777899A

United States Patent [19]

Kumagai

[11] Patent Number: 5,777,899

[45] Date of Patent: Jul. 7, 1998

[54] HORIZONTAL POSITION ERROR CORRECTION MECHANISM FOR ELECTRONIC LEVEL

[75] Inventor: Kaoru Kumagai, Tokyo, Japan

[73] Assignee: Kabushiki Kaisha TOPCON, Tokyo, Japan

[21] Appl. No.: 755,031

[22] Filed: Nov. 22, 1996

[30] Foreign Application Priority Data

Nov. 24, 1995 [JP] Japan .................................... 7-329768

[51] Int. Cl.$^6$ ................................ G01C 3/08; G01C 9/00

[52] U.S. Cl. .................. 364/571.02; 364/559; 356/4.08; 356/4.03; 33/291; 33/293

[58] Field of Search .............................. 364/571.02, 559, 364/570; 356/4.08, 4.03, 4.01, 350, 357, 372; 33/293, 294, 291, 706

[56] References Cited

U.S. PATENT DOCUMENTS

| | | | |
|---|---|---|---|
| 3,736,058 | 5/1973 | Iadarola | 356/4.08 |
| 4,484,816 | 11/1984 | Ohtomo et al. | 356/372 |
| 5,430,548 | 7/1995 | Hiroi et al. | 356/394 |
| 5,459,932 | 10/1995 | Rando et al. | 33/291 |
| 5,524,352 | 6/1996 | Rando et al. | 33/291 |
| 5,537,200 | 7/1996 | Kumagai et al. | 356/4.01 |
| 5,537,201 | 7/1996 | Kumagai et al. | 356/4.08 |

*Primary Examiner*—Emanuel Todd Voeltz
*Assistant Examiner*—Bryan Bui
*Attorney, Agent, or Firm*—Baker & Botts, L.L.P.

[57] ABSTRACT

In a horizontal position error correction mechanism for an electronic level according to the present invention, a collimation optical system collimates a level rod, and a calculation processing device processes an output signal of a photoelectric converter by calculation to calculate a difference of elevation and so forth. A compensator device formed on a telescope optical system for maintaining a horizontal position corrects an inclination of the electronic level to maintain the horizontal position of the electronic level, and a suspended optical member suspended from the compensator device is rocked in forward and backward directions and leftward and rightward directions in response to an inclination of the compensator device. Inclination angle detection device detects an inclined angle of the suspended optical member, and the calculation processing device calculates an inclination angle data signal of the compensator device based on a detection signal of the inclination angle detection device so that the horizontal position error of the suspended optical member can be corrected.

7 Claims, 11 Drawing Sheets

HORIZONTAL POSITION ERROR CORRECTION MECHANISM FOR ELECTRONIC LEVEL

BACKGROUND OF THE INVENTION

This invention relates to a vibration error correction mechanism for an electronic level which can convert a pattern image of a level rod into an electric signal by a photo-electric converter and automatically measure a difference of elevation or the like making use of the obtained electric signal, and more particularly to a mechanism wherein means for detecting an inclination angle is provided for compensator means and the difference between an average inclination angle within a fixed time and an average inclination angle within a photo-electric conversion time is calculated to correct a horizontal position error of the electronic level caused by vibrations and correct a horizontal position error of the compensator means from the average inclination angle within the fixed time and a horizontal position error stored in advance.

Conventionally, in order to effect a direct level measurement or the like, a level and a level rod are used. In particular, a measuring person visually observes graduations of a level rod using a level to measure a difference of elevation. In a measurement with the classic level, a read error by the measuring person occurs frequently. In order to eliminate such read error, an electronic level wherein a graduation reading operation of the level rod is performed electronically has been developed. The electronic level is constructed, for example, such that light including a predetermined signal is emitted from the level rod side and is received and identified by the electronic level side to read a graduation of the level rod.

The applicant of the present invention has developed an electronic level wherein a difference of elevation can be read electronically. The electronic level 1 employs, as shown in FIG. 2, a level rod 2 for an electronic level on which a first pattern A, a second pattern B and a third pattern R are disposed repetitively at an equal distance (p). In particular, blocks each including the three different patterns are successively formed on the level rod 2, and where the block disposed at the leftmost position is defined as 0 block and the patterns of the 0 block are represented as R(0), A(0) and B(0), the patterns following them are disposed repetitively like R(1), A(1), B(1), R(2), A(2), B(2), . . . It is to be noted that, since all patterns are repeated at the equal distance p, a signal corresponding to the distance can be used as a reference signal.

For example, the third pattern R has a fixed width of 8 mm of black; the first pattern A has a black portion having a width modulated so that 600 mm may make one period; and the second pattern B has a black portion having a width modulated so that 570 mm may make one period.

Here, a principle in determination of a horizontal position of the level rod 2 for an electronic level is described. Since the first pattern A of the level rod 2 for an electronic level has the black portion whose width is modulated so that 600 mm may make one period, if the modulation width is 0 to 10 mm, then the width $D_A$ of the first pattern is given by the following expression:

$$D_A=5\times(1+\mathrm{SIN}\ (2\times\pi\times X/600-\pi/2)) \quad (1)$$

where X=(10 mm, 40 mm, 70 mm, . . . ).

Similarly, since the second pattern B of the level rod 2 for an electronic level has the block portion whose width is modulated so that 570 mm may make one period, the width $D_B$ of the second pattern is given by the following expression:

$$D_B=5\times(1+\mathrm{SIN}\ (2\times\pi\times X/570+\pi/2)) \quad (2)$$

where X=(20 mm, 50 mm, 80 mm, . . . ).

It is to be noted that, while the offsets of $\pm\pi/2$ are added in the expressions (1) and (2) above, this is intended to facilitate separation of a signal originating from the first pattern A and another signal originating from the second pattern B from each other in signal processing.

Since the first pattern A and the second pattern B have periods different a little from each other, similar patterns appear after each distance which is the least common multiple of them. In the present embodiment, similar patterns appear after each 11,400 mm which is the least common multiple of 600 mm and 570 mm. Accordingly, the phase difference between the signal originating from the first pattern A and the signal originating from the second pattern B varies from 0 to $2\pi$ within the range of 0 to 11,400 mm.

In particular, where the phase of the signal originating from the first pattern A in the horizontal position is represented by $\phi_A$ and the phase of the signal originating from the second pattern B in the horizontal position is represented by $\phi_B$, the horizontal position H of the level rod 2 for an electronic level is given by $$H=11{,}400\times((\phi_B-\phi_A-\pi)/(2\pi))\ \mathrm{mm} \quad (3)$$

Subsequently, a method of calculating the distance between the electronic level 1 and the level rod 2 for an electronic level will be described.

If the level rod 2 for an electronic level is read using the electronic level 1 and Fourier transform is performed for a result of the reading, then, as seen from a power spectrum of FIG. 4, periodical components of the first pattern A, periodical components of the second pattern B, periodical components (having a period three times that of a reference signal) each including one set (one block) of the third pattern R, the first pattern A and the second pattern B, and periodical components of the reference signal (corresponding to the equal distance pitch (p) of the patterns) are obtained. It is to be noted that the spectrum groups are displaced toward the lower frequency side as the distance between the electronic level 1 and the level rod 2 for an electronic level decreases. And, one of the spectrum groups which has the smallest period is the reference signal (corresponding to the equal distance pitch (p) of the patterns). Since the equal distance pitch is fixed to p, the distance between the electronic level 1 and the level rod 2 for an electronic level can be calculated using the image formation formula of a lens.

In particular, since, as shown in FIG. 9, the equal distance pitch p of the level rod 2 for an electronic level is formed into an image w by a lens of the electronic level 1, where the distance from the lens to the level rod 2 for an electronic level is represented by L and the distance from the lens to the image is represented by d, $$L=d(p/w)$$

and, since $d\approx f$ (f is the focal length of the lens), $$L=d(p/w)\approx f(p/w)$$

Further, where the length of one pixel of a linear sensor 15 is represented by C and one wavelength of a frequency (cycles) corresponding to the equal distance pitch p obtained by the linear sensor 15 is represented by k, the image w by the lens of the electronic level 1 is given by w =Ck. Accordingly, the distance L between the electronic level 1 and the level rod 2 for an electronic level is given by $$L=((f/C\times k))\times(p) \quad (4)$$

Accordingly, a rough distance between the electronic level 1 and the level rod 2 for an electronic level can be calculated.

Subsequently, a principle of a measurement of a level height will be described.

First, a principle in a measurement of a long distance will be described.

As shown in FIG. 13, a signal corresponding to the equal distance pitch p can be obtained by Fourier transform of a signal obtained by the linear sensor 15. Here, where the phase obtained by the fast Fourier transform is represented by θ and the phase at an address position (mth bit) of the linear sensor 15 corresponding to the horizontal position is represented by $\theta_m$.

$$H_1=(\theta_m/360°)\times p \quad (5)$$

In other words, the horizontal position $H_1$ can be measured precisely within the equal distance pitch p (precise measurement).

Further, in order to detect the horizontal position, a rough position from the pattern start position of the equal distance pitch, p formed on the level rod 2 for an electronic level must be detected. Therefore, an output signal of the linear sensor 15 is integrated for former and latter half pitches of the reference signal (signal corresponding to the equal distance pitch p). Further, if such integration values are sampled for each three values (product detection), then, as shown in FIG. 14, a signal 1 corresponding to the first pattern A, a signal 2 corresponding to the second pattern B and a signal 3 corresponding to the third pattern R are obtained. However, since the third pattern R is not modulated in width and besides the maximum modulation width of the third pattern R is 8 mm while the maximum modulation widths of the first pattern A and the second pattern B are 10 mm, the signal 3 corresponding to the third pattern R exhibits a substantially fixed integration value which is substantially equal to 80% that of the signal 1 or the signal 2.

Further, since the third pattern R, the first pattern A and the second pattern B are disposed repetitively in a predetermined order, it can be determined which one of the third pattern R, the first pattern A and the second pattern B the sampled signals are. Further, in order to eliminate an influence of disturbance light such as shading, signals of (A-R) and (B-R) are obtained with reference to the signal corresponding to the third pattern R as shown in FIG. 15.

Subsequently, if, from the signals of (A-R) and (B-R), a set of signals of R, (A-R) and (B-R) including the reference signal and including the address position (mth bit) of the linear sensor 15 corresponding to the horizontal position are selected and then the phases of the signals (A-R) and (B-R) are detected, then it can be determined a combination of the first pattern A, the second pattern B and the third pattern R at which position of the level rod 2 for an electronic level the set of signals R, (A-R) and (B-R) are.

Here, where the (A-R) signal is represented by Am, the (B-R) signal is represented by Bm, one half the maximum amplitude of the (A-R) signal is represented by Wa and one half the maximum amplitude of the (B-R) signal is represented by Wb, the phases of the signals (A-R) and (B-R) are respectively given by $$\phi_a=\mathrm{SIN}^{-1}\,(Am/Wa) \quad (6)$$

$$\phi_b=\mathrm{SIN}^{-1}\,(BM/Wb)-2\times\pi(10/570) \quad (7)$$

The fraction portion of the expression (7) above is provided because the position of the signal corresponding to the second pattern B is displaced by 10 mm from the signal corresponding to the first pattern A.

If the expressions (6) and (7) are substituted into the expression (3), then the horizontal position of the level rod 2 for an electronic signal of the signal corresponding to the first pattern A can be obtained. Further, if the reference signal including the horizontal position belongs to the third pattern R, then the horizontal position should be decremented by 10 mm, but if the reference signal including the horizontal position is the second pattern B, then the horizontal position should be incremented by 10 mm. As a result, a rough level height $H_2$ of the horizontal position can be obtained (rough measurement).

As described above, the level position H can be determined by detecting the phase of the reference signal at the horizontal position (precision measurement), detecting it from the phase difference between the first pattern A and the second pattern B at which position the reference signal corresponding to the horizontal position is with reference to the pattern start position of the level rod 2 for an electronic level (rough measurement) and then adjusting the places of the precise measurement $H_1$ and the rough measurement $H_2$ relative to each other.

Subsequently, a principle in a measurement of a short distance will be described.

In a short distance measurement, if a signal width is measured directly, then a higher degree of accuracy can be anticipated because an image of the first pattern A, the second pattern B and the third pattern R which is clearer than that obtained by performing Fourier transform and then performing product detection to detect a level height as in the long distance measurement is obtained.

First, as shown in FIG. 16, an output signal of the linear sensor 15 is differentiated in order to detect rising and falling edges of the output of the linear sensor 15. From those edges, the distance between the edges of black portions can be detected. Further, a bit which corresponds to the center of each of the black portions is detected. The distance between such bits makes a reference signal which is the equal distance pitch p of the first pattern A, the second pattern B and the third pattern R.

Then, if the positions of the reference signals forwardly and rearwardly of a address position (mth bit) corresponding to the horizontal position are detected, since the width of the reference signals corresponds to 10 mm on the level rod 2 for an electronic level, where the forward the rearward reference signals are represented by $N_f$ ($N_f$-th bit) and $N_b$ ($N_b$-th bit), respectively, then, $$H_1=((m-N_f)/(N_b-N_f))\times 10 \quad (8)$$

(precision measurement)

Where the start position of the reference signals is represented by $N_s$, the last position is represented by $N_e$ and the number of the reference signals is represented by n, then the average of the distances of the reference signals is given by $$k=(N_e-N_s)/n$$

and, if k thus calculated is substituted into the expression (4), then a rough distance between the electronic level 1 and the level rod 2 for an electronic level can be calculated.

Then, the widths of the black portions are sampled for each three widths beginning with the first width and then the third pattern R of the fixed width is recognized. Since the patterns are arranged in the order of the third pattern R, the first pattern A and the second pattern B, a corresponding relationship of the third pattern R, the first pattern A and the second pattern B is determined.

Further, it is determined to which one of the third pattern R, the first pattern A and the second pattern B the reference signal including the address position (mth bit) of the linear sensor 15 corresponding to the horizontal position belongs, and to which number block the reference signal corresponds. In particular, if the reference signal belongs to the patterns R(n), A(n) and B(n), then this signifies that the reference signal belongs to the nth block.

Then, from the expression (1), $$D_A=5\times(1+\mathrm{SIN}\ (2\times\pi\times Xa/600-\pi/2))$$

where Xa=30×n+10. Consequently, n can be calculated from the value of $D_A$.

Accordingly, $$n=(10/\pi)\times(\phi_a+(\pi/2))-(1/3) \quad (9)$$

where $\phi_a=\mathrm{SIN}^{-1}$ ((DA/5)−1). While two values of $\phi_a$ are present within a range from 0 to 2π, from the condition that n is an integer, only one of the two values is selected. If the block number is represented by na, then since the blocks are present in the period of 600 mm (that is, for each 20 blocks) on the level rod 2 for an electronic level, $$n=20\times d+na$$

where d=0, 1, 2, 3, . . .

Then, using this n, the width $D_B$ of the second pattern B is calculated. Then, $$X=30\times n+20$$

is substituted into the expression (2), and a resulting value is compared with the width $D_B$, and the value of n when coincidence is determined is the block number to be detected. Depending upon the types of the third pattern R, the first pattern A and the second pattern B to which the nth and mth block belong, the rough level height $H_2$ (rough measurement) is given by $$H_2=30\times n,\ \text{for the third patter R,}$$

$$H_2=30\times n+10,\ \text{for the first pattern A,}$$

$$H_2=30\times n+20,\ \text{for the second pattern B} \quad (10)$$

It is to be noted that the error rate arising from soiling to a pattern or the like can be reduced if the judgment is performed not only for a single set of patterns but also for several forward and rearward sets of patterns.

Accordingly, a level height can be determined by detecting reference signals from widths of black portions of signals corresponding to the third pattern R, the first pattern A and the second pattern B and determining the reference signal at an address position corresponding to the horizontal position to effect a precise measurement, performing a rough measurement from a phase difference between signals corresponding to the first pattern A and the second pattern B and effecting an adjustment in place of the precision measurement $H_1$ and the rough measurement $H_2$.

While a measurement method wherein distinction of a pattern signal modulated using the third pattern R which is not in a modulated state in addition to the first pattern A and the second pattern B which are in modulated states is described above, if a signal of the first pattern A and a signal of the second pattern B can be distinguished from each other by detecting wavelengths from signals corresponding to the two kinds of patterns detected or the like, then a measurement can be performed without using the third pattern R.

However, while the electronic level described above can automatically detect a difference of elevation, it has a problem in that, in measurement in the open air in which fine vibrations are present, also compensator means built in the electronic level are vibrated and a suspended optical member mounted in a suspended condition are vibrated, which causes a measurement error, and also in that a horizontal position correction error of the compensator is produced by a dispersion of parts or the like.

Particularly, in a measurement on a bridge on which considerable vibrations are present, the bad influence of the vibrations is significant, and a countermeasure against vibrations is desired strongly. Thus, against a horizontal position error, it is desired strongly that a horizontal position can be detected with a high degree of accuracy even by a compensator which is conventionally used for a general use.

SUMMARY OF THE INVENTION

In a horizontal position error correction mechanism for an electronic level according to the present invention, a collimation optical system collimates a level rod, and calculation processing means processes an output signal of a photoelectric converter by calculation to calculate a difference of elevation and so forth. Compensator means formed on a telescope optical system for maintaining a horizontal position corrects an inclination of the electronic level to maintain the horizontal position of the electronic level, and a suspended optical member suspended from the compensator means is rocked in forward and backward directions and leftward and rightward directions in response to an inclination of the compensator means. Inclination angle detection means detects an inclined angle of the suspended optical member, and the calculation processing means calculates an inclination angle data signal of the compensator means based on a detection signal of the inclination angle detection means so that the horizontal position error of the suspended optical member can be corrected.

BRIEF DESCRIPTION OF THE DRAWINGS

FIG. 10(*b*) is a diagram showing an output voltage where a pair of light reception/emission elements are provided;

DESCRIPTION OF THE INVENTION

An embodiment of the present invention will be described with reference to the drawings.

Figure 1:
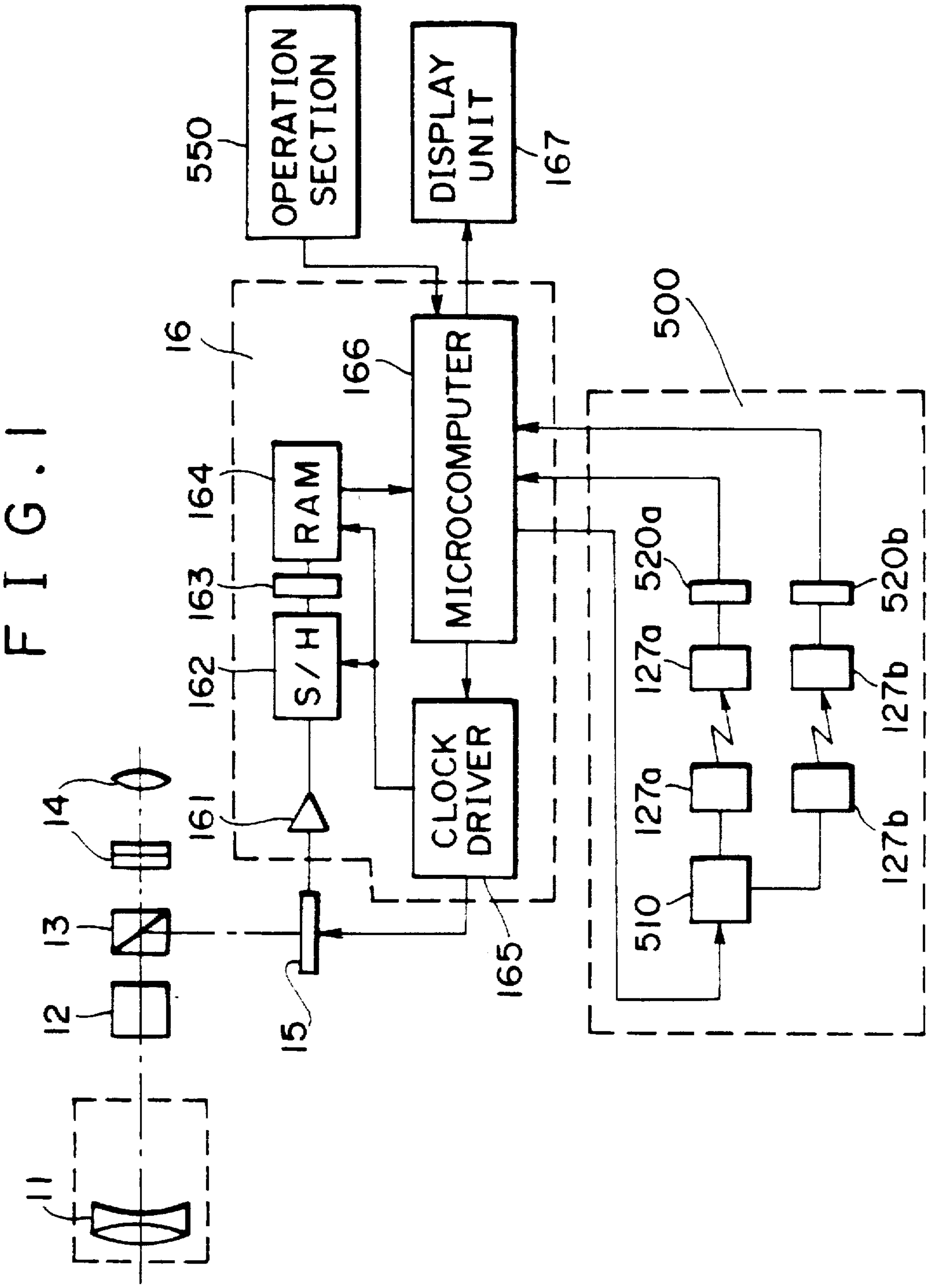
FIG. 1 is a block diagram showing a construction of an electronic level of an embodiment of the present invention.
Figure 2:
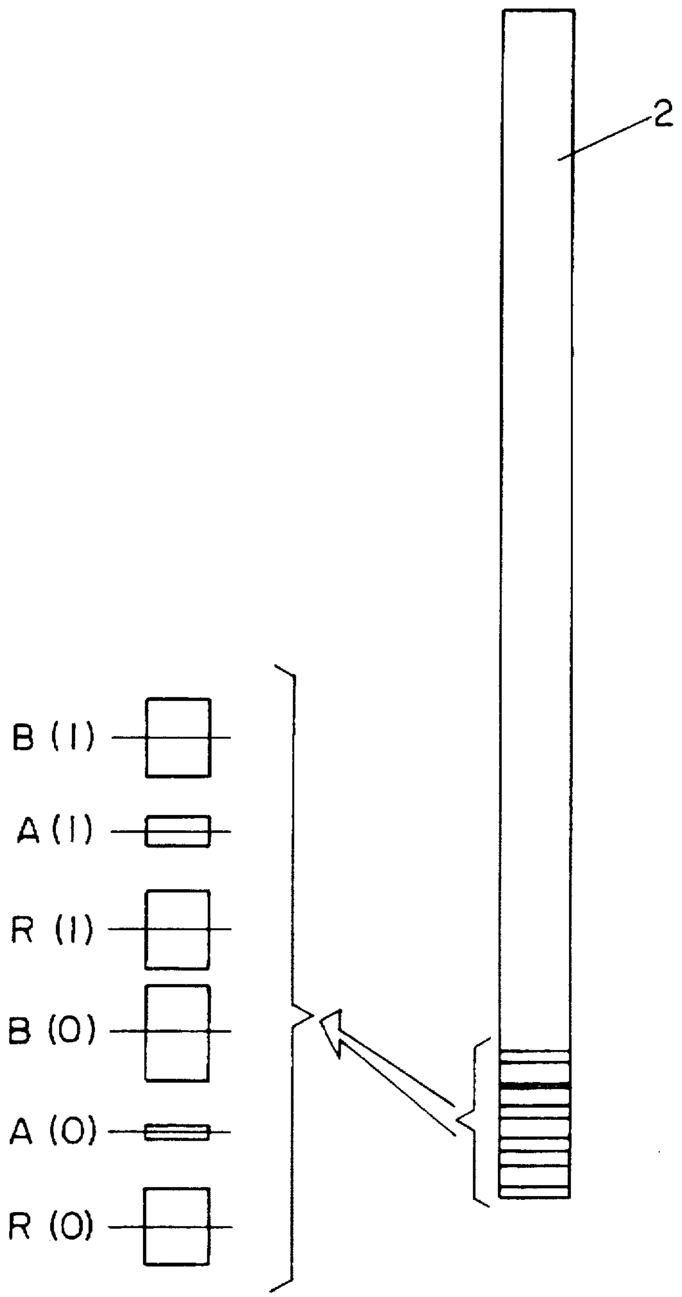
FIG. 2 is a diagrammatic view illustrating a level rod for an electronic level in the embodiment.
Figure 3:
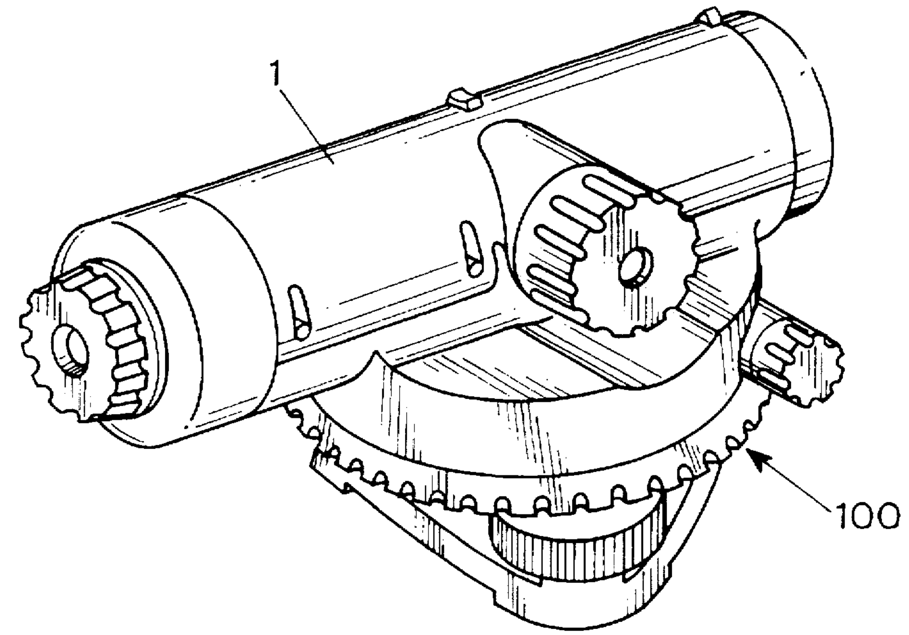
FIG. 3 is a perspective view showing an outer appearance of an electronic level in the present embodiment.
Figure 4:
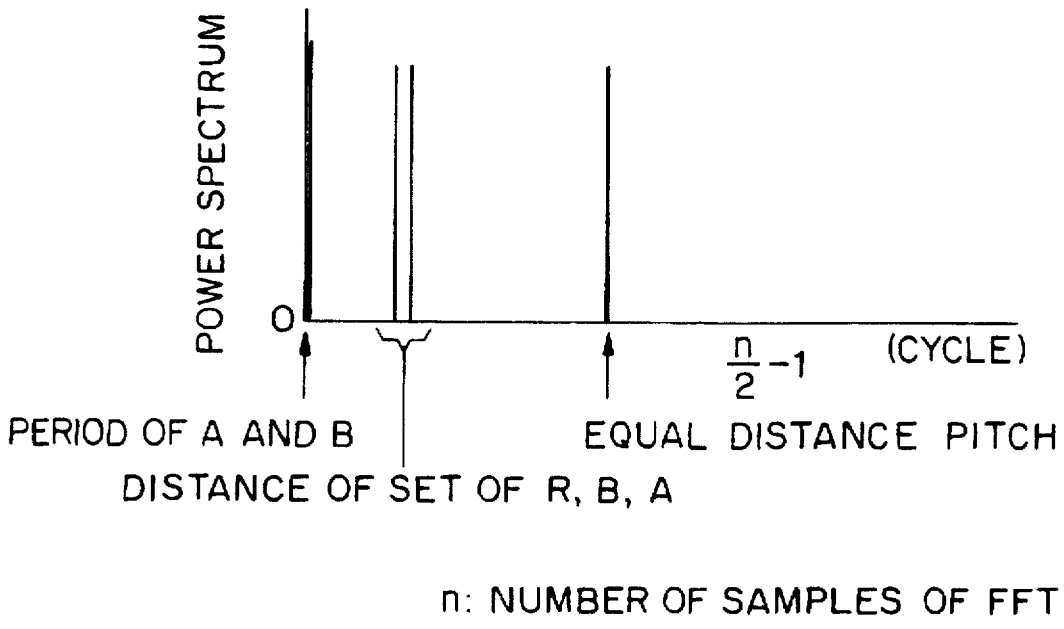
FIG. 4 is a diagram view showing a power spectrum of an output signal.

Referring to FIGS. 1 to 3, the measuring instrument of the present embodiment includes an electronic level 1 and a level rod 2 for an electronic level. The electronic level 1 is placed on a leveling apparatus 100 as shown in FIG. 3 and includes an objective lens section 11, a compensator 12, a beam splitter 13, an eyepiece section 14, a linear sensor 15, calculation processing means 16 and an inclination angle detection section 500.

The objective lens section 11 is provided to form an image of an electronically reading pattern of the level rod 2 for an electronic level. The objective lens section 11 in the present embodiment is composed of an objective lens and an internal lens and can be focused for an image of the pattern of the level rod 2 for an electronic level by moving the internal lens. The beam splitter 13 is provided to split light into light directed to the eyepiece section 14 and another light directed to the linear sensor 15. The eyepiece section 14 is provided so that a measuring person visually observes the level rod 2 for an electronic level therethrough. It is to be noted that the objective lens section 11 and the eyepiece section 14 correspond to a collimation optical system for observing a graduation for visual observation of the level rod 2 for an electronic level while the objective lens section 11 and the linear sensor 15 correspond to a measurement optical system.

Figure 5:
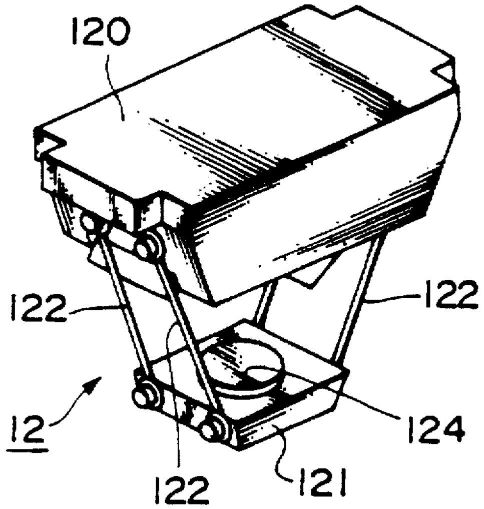
FIG. 5 is a perspective view showing a compensator in the present embodiment.
Figure 6:
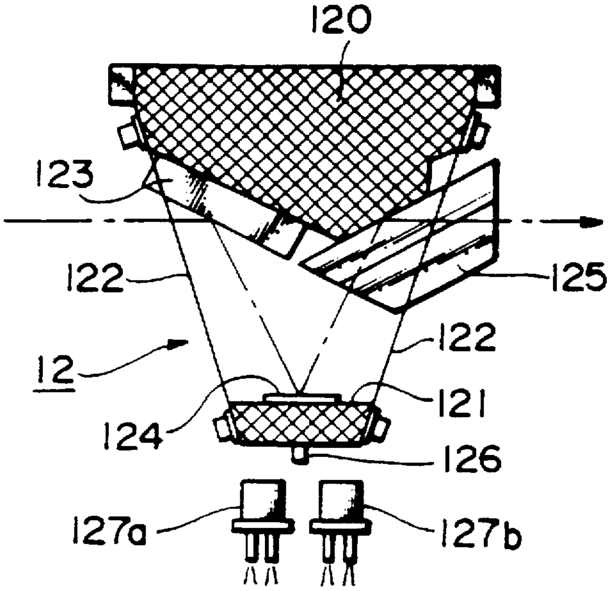
FIG. 6 is a schematic view showing the compensator in the present embodiment.

The compensator 12 is provided to correct the inclination of the electronic level 1 and includes, as shown in FIGS. 5 and 6, a compensator body 120, a suspended optical member 121 suspended from the compensator body 120, four suspending wires 122 for suspending the suspended optical member 121 thereon, a first mirror 123, a second mirror 124, a prism 125, a reflection mark 126, two first light reception/emission sections 127*a* and two second light reception/emission sections 127*b*.

The four suspending wires 122 are attached to the four corners of the compensator body 120 such that the suspended optical member 121 can be suspended thereon.

The suspended optical member 121 is mounted for rocking motion in the forward and backward directions and the leftward and rightward directions in response to the inclination of the electronic level 1. The second mirror 124 is formed on an upper face of the suspended optical member 121 while the reflection mark 126 is formed on a lower face of the suspended optical member 121.

Light introduced to the first mirror 123 is reflected by the first mirror 123 so that it is introduced to the second mirror 124 on the suspended optical member 121. Then, the light reflected from the second mirror 124 is introduced to the prism 125 and then radiated from the prism 125 to the eyepiece section 14. Since the suspended optical member 121 is suspended for rocking motion in the forward and backward directions and the leftward and rightward directions, it can move in accordance with the inclination of the electronic level 1.

The reflection mark 126 is formed on the lower face of the suspended optical member 121. Disposed at a position opposing to the reflection mark 126 are the two first light reception/emission sections 127*a* and the two second light reception/emission sections 127*b* for detecting the reflection mark 126 of the suspended optical member 121 in an inclined position. The two first light reception/emission sections 127*a* and the two second light reception/emission sections 127*b* are disposed at left and right symmetrical positions to each other with respect to the reflection mark 126 so that the inclination angle of the suspended optical member 121 can be detected by detecting phase differences between output signals of the first light reception/emission sections 127*a* and the second light reception/emission sections 127*b*.

Figure 7:
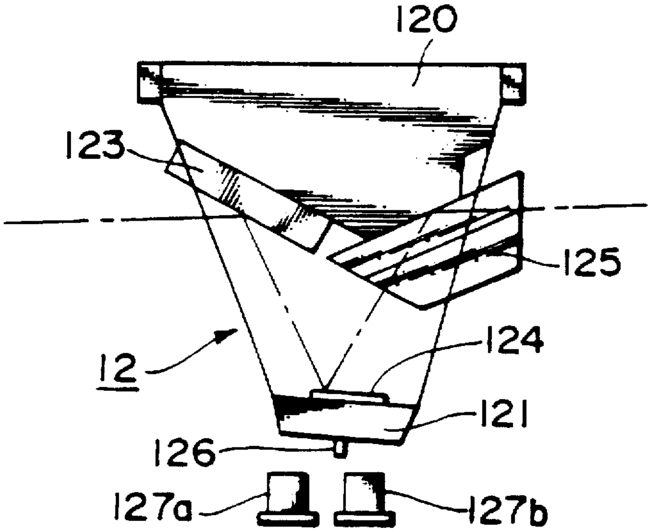
FIG. 7 is a diagrammatic view showing the compensator in the present embodiment which is in an inclined position.

In particular, if the suspended optical member 121 is inclined as seen in FIG. 7, then an imbalance is produced between the output signals of the first light reception/emission sections 127*a* and the second light reception/emission sections 127*b*, and if the imbalance amount is detected, then the inclination angle of the suspended optical member 121 can be detected.

It is to be noted that the compensator 12 corresponds to compensator means, and the first light reception/emission sections 127*a*, the second light reception/emission sections 127*b* and the reflection mark 126 correspond to inclination angle detection means. Further, the reflection mark 126 corresponds to a reflection member.

The linear sensor 15 converts a pattern image of the level rod 2 for an electronic level formed by the objective lens section 11 into an electric signal. In the present embodiment, a CCD linear sensor is used for the linear sensor 15. Any linear image sensor can be employed for the linear sensor 15 only if photodiodes are arranged at least one-dimensionally thereon.

The calculation processing means 16 corresponds to a signal processing section and includes an amplifier 161, a sample hold circuit 162, an analog to digital converter 163, a RAM 164, a clock driver 165 and a microcomputer 166. A display unit 167 is connected to the calculation processing means 16. It is to be noted that the calculation processing means 16 of the present embodiment includes inclination angle data signal formation means, first inclination angle signal storage means, second inclination angle signal storage means, fixed time average inclination angle detection means, photoelectric conversion time average inclination angle detection means, correction amount calculation means and horizontal position correction error storage means.

Here, the calculation processing means 16 incorporated in the electronic level 1 of the present embodiment will be described in detail with reference to FIG. 1. The amplifier 161 amplifies an electric signal from the linear sensor 15, and the sample hold circuit 162 sample holds the amplified electric signal with a timing signal from the clock driver 165. The analog to digital converter 163 converts the sample held electric signal from an analog signal into a digital signal. The RAM 164 stores the digital signal obtained by such analog to digital conversion. The microcomputer 166 executes various calculations.

The objective lens section 11, the beam splitter 13 and the eyepiece section 14 correspond to a telescope optical system, and the linear sensor 15 corresponds to a photoelectric converter.

The inclination angle detection section 500, an operation section 550 and the display unit 167 are connected to the calculation processing means 16.

The inclination angle detection section 500 includes a light emission section driver 510 for driving the first light reception/emission sections 127*a* and the second light reception/emission sections 127*b* to emit light, an analog to digital conversion section 520*a* for converting reception light signals of the first light reception/emission sections 127*a* from analog signals into digital signals, and a second analog to digital conversion section 520*b* for converting reception light signals of the second light reception/emission sections 127*b* from analog signals into digital signals.

Figure 8:
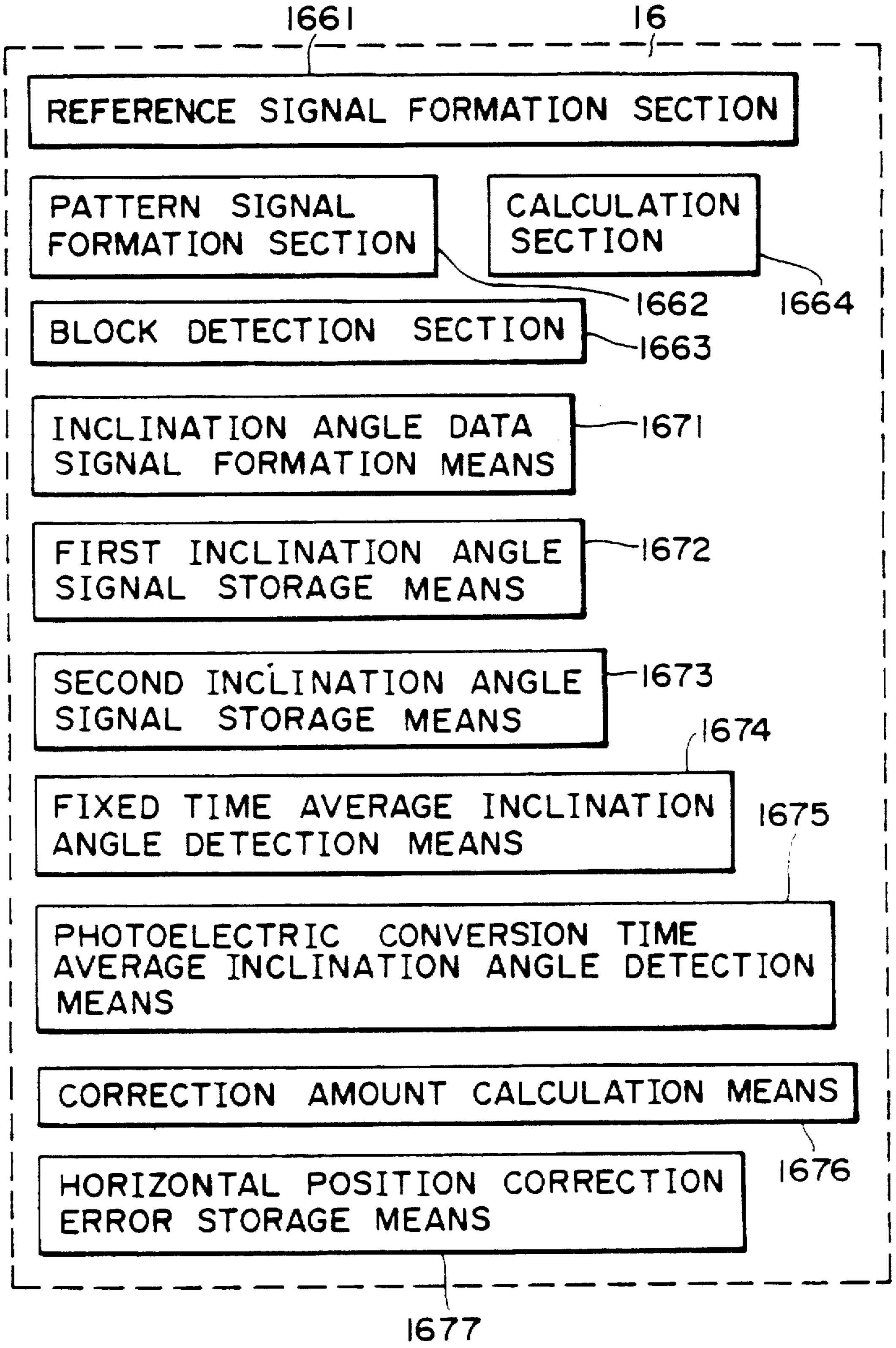
FIG. 8 is a diagrammatic view showing a construction of calculation processing means of the present embodiment.

Here, functions of the microcomputer 166 will be described with reference to FIG. 8. The calculation processing means 16 includes a reference signal formation section 1661, a pattern signal formation section 1662, a block detection section 1663, a calculation section 1664, inclination angle data signal formation means 1671, first inclination angle signal storage means 1672, second inclination angle signal storage means 1673, fixed time average inclination angle detection means 1674, photoelectric conversion time average inclination angle detection means 1675, correction amount calculation means 1676 and horizontal position correction error storage means 1677.

The reference signal formation section 1661 forms, upon long distance measurement, reference signals corresponding to the equal distance pitch p by fast Fourier transform from an electric signal obtained from the linear sensor 15, but differentiates, upon short distance measurement, an output signal of the linear sensor 15 to form reference signals from rising and falling edges of the output signal.

The pattern signal formation section 1662 integrates, upon long distance measurement, the reference signal for the former and latter half pitches and samples for each third integration values (product detection) to form a first pattern signal and a second pattern signal, but performs, upon short distance measurement, a sampling operation for the reference signals to form a first pattern signal and a second pattern signal.

The block detection section 1663 compares, upon short distance measurement, the width $D_A$ of the first pattern A and the width $D_B$ of the second pattern B to determine which numbered block the block which corresponds to the horizontal position is.

The calculation section 1664 calculates, upon long distance measurement, a difference of elevation from the phases of the first pattern signal and the second pattern signal in the proximity of the collimation axis, but calculates, upon short distance measurement, a difference of elevation based on the specified block.

It is to be noted that, since electronically reading patterns 21 have an equal distance pitch, the distance (horizontal distance) between the electronic level 1 and the level rod 2 for an electronic level can be calculated based on the image formation formula of a lens, and besides a difference of elevation can be calculated by the calculation section 1664, and consequently, those functions correspond to a measurement section.

Figure 9:
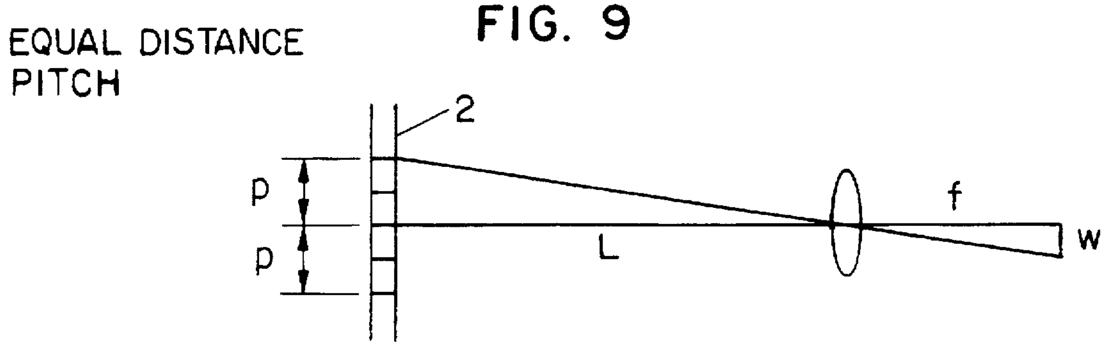
FIG. 9 is a diagrammatic view illustrating a principle of a measurement of a horizontal distance in the present embodiment.

In particular, since the equal distance pitch p of the level rod 2 for an electronic level is converted into an image w by the lens of the electronic level 1 as seen in FIG. 9, where the distance from the lens to the level rod 2 for an electronic level is represented by L and the distance from the lens to the image is represented by d, $$L=d(p/2)$$

and since d≈f (f is a focal length of the lens), $$L=d(p/2)\approx f(p/w)$$

Further, where the length of one pixel of the linear sensor 15 is represented by C and one wave length of a frequency (cycles) corresponding to the equal distance pitch p obtained by the linear sensor 15 is represented by k, the image w by the lens of the electronic level 1 is given by w=Ck. Accordingly, the distance L between the electronic level 1 and the level rod 2 for an electronic level is given by $$L=((f/(C\times k))\times(p) \quad (4)$$

Consequently, the horizontal distance between the electronic level 1 and the level rod 2 for an electronic level can be detected.

Figure 10:
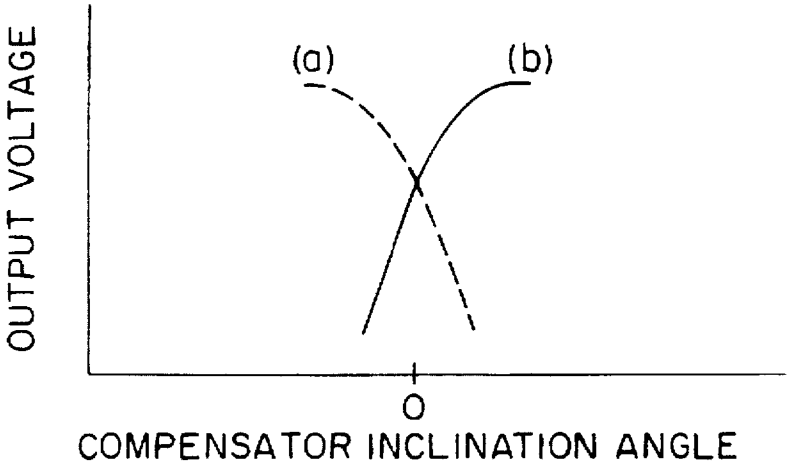
FIG. 10(*a*) is a diagram showing output voltages of a first light reception/emission section and a second light reception/emission section.
Figure 10:
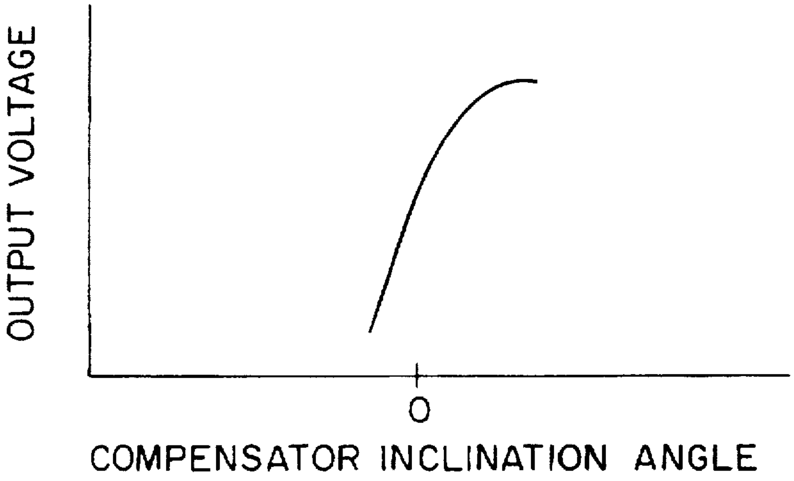

The inclination angle data signal formation means 1671 forms a data signal corresponding to the inclination angle of the suspended optical member 121 from reception light signals from the first light reception/emission sections 127*a* and the second light reception/emission sections 127*b*. If the suspended optical member 121 is inclined as seen in FIG. 10(*a*), then the output voltages of the first light reception/emission sections 127*a* exhibits such a variation as indicated by a curve (a) while the output voltages of the second light reception/emission sections 127*b* exhibit such a variation as indicated by another curve (b). It is to be noted that a mountain portion of each of the curves of the output voltages is provided when the reflection mark 126 of the suspended optical member 121 is positioned in the same vertical line as the light reception/emission section. It is to be noted that, where each of the light reception/emission sections includes a pair of elements, the output voltage thereof exhibits such a variation as shown in FIG. 10(*b*).

Accordingly, if reception light signals of the first light reception/emission sections 127*a* and the second light reception/emission sections 127*b* are converted from analog signals into digital signals by the analog to digital conversion section 520*a* and the second analog to digital conversion section 520*b*, respectively, and then a phase difference between them is calculated, then the inclination direction and the inclination angle of the suspended optical member 121 can be obtained.

It is to be noted that, where each of the light reception/emission sections includes a pair of elements, the inclination direction and the inclination angle of the suspended optical member 121 can be obtained by calculation of outputs of the second analog to digital conversion section 520*b*. Where each of the light reception/emission sections includes two pairs of elements, the sensitivity is increased to twice that obtained where each of the light reception/emission sections includes a single pair of elements, and a measurement can be performed with a higher sensitivity.

Figure 11:
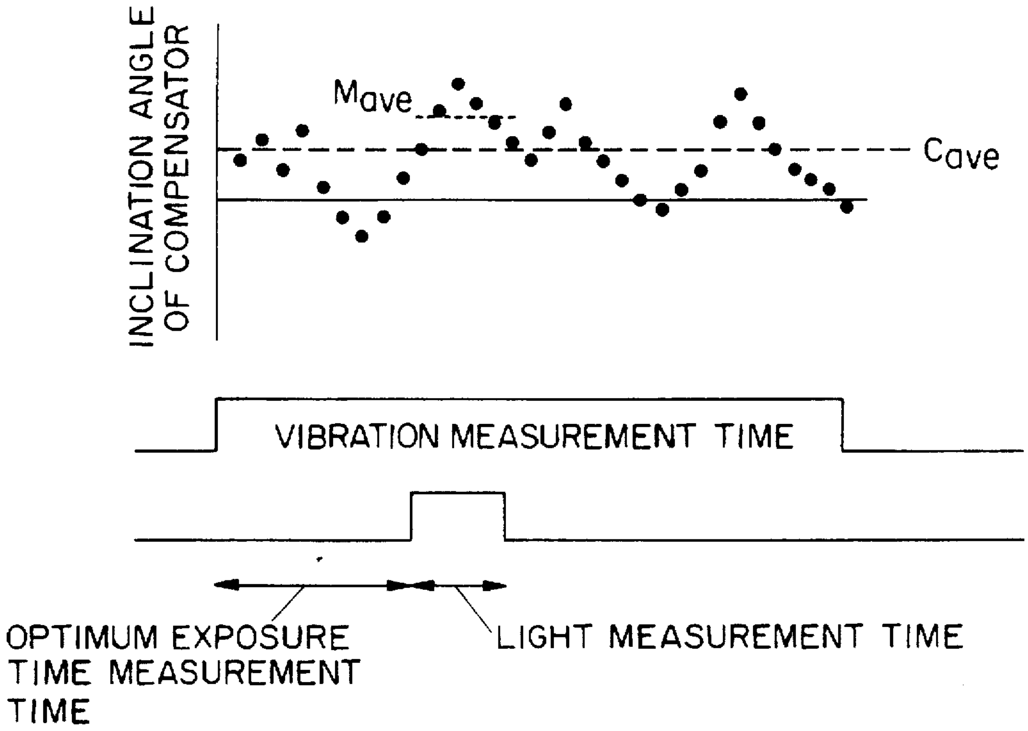
FIG. 11 is a diagram illustrating removal of a measurement error caused by vibrations of the compensator in the present embodiment.

The first inclination angle signal storage means 1672 fetches and stores an inclination angle data signal of the compensator 12 obtained by the inclination angle data signal formation means 1671 for a fixed period of time as seen in FIG. 11. This fixed period of time is longer than the period of the natural frequency of the compensator 12 but shorter than the measurement time of the electronic level 1.

The second inclination angle signal storage means 1673 fetches and stores an inclination angle data signal of the compensator 12 obtained by the inclination angle data signal formation means 1671 for a period of time within which light is measured by the linear sensor 15 which serves as a photoelectric converter as seen in FIG. 11.

It is to be noted that the calculation processing means 16 measures, before a measurement of the electronic level 1 is started, an output signal of the linear sensor 15 and determines a fetching time of the linear sensor 15 with which an appropriate exposure can be obtained. Accordingly, the measurement time of the linear sensor 15 is started after the determination operation of the fetching time with which an appropriate exposure can be obtained from a start point of the fixed time stored in the first inclination angle signal storage means 1672 is completed.

The fixed time average inclination angle detection means 1674 cumulatively adds inclination angle data signals of the compensator 12 stored in the first inclination angle signal storage means 1672 to calculate a fixed time average inclination angle detection signal $C_{ave}$.

The photoelectric conversion time average inclination angle detection means 1675 cumulatively adds inclination angle data signals of the compensator 12 stored in the second inclination angle signal storage means 1673 to calculate a photoelectric conversion time average angle detection signal $M_{ave}$. This photoelectric conversion time average angle detection signal $M_{ave}$ has a correlation with the height calculated by the calculation processing means 16.

The correction amount calculation means 1676 calculates a difference between the fixed time average inclination angle detection signal $C_{ave}$ obtained by the fixed time average inclination angle detection means 1674 and the photoelectric conversion time average angle detection signal $M_{ave}$ obtained by the photoelectric conversion time average inclination angle detection means 1675 based on S=fixed time average inclination angle detection signal $C_{ave}$−photoelectric conversion time average angle detection signal $M_{ave}$ and converts the value of the thus obtained difference S as a correction amount into a height to remove a horizontal position error of the compensator 12 arising from vibrations of the compensator 12.

In other words, since the compensator 12 and the electronic level 1 are attached integrally to each other, the horizontal position error of the compensator 12 originating from its vibrations can be removed.

Here, a concrete example of use of the horizontal position correction error storage means 1677 will be described with reference to FIG. 12.

The compensator 12 physically operates the mirrors 123 and 124 and the prism 125 to optical correct the inclination angle in the collimation direction.

The compensator 12 is adjusted in collimation direction and follow-up property to an inclination when it is manufactured. In particular, the collimation direction is adjusted by adjusting the suspending state of the suspending wires, and the follow-up property is adjusted by adding a weight or by displacing a reference position. While the follow-up property is adjusted so as to fall within an error range, where the electronic level has such a high degree of precision as that of a first class level, the adjustment is not ready and usually the compensator 12 is not used.

Figure 12:
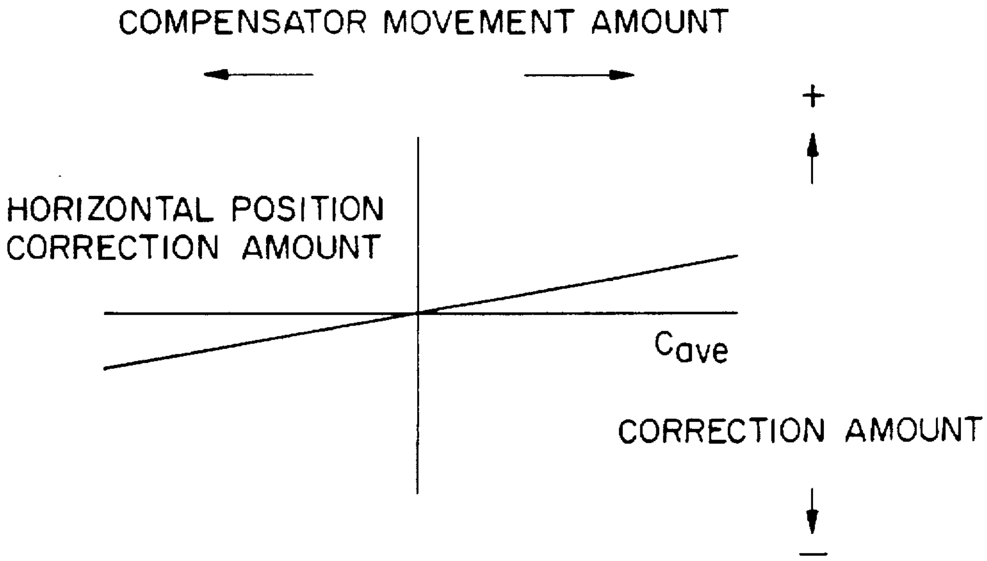
FIG. 12 is a diagram illustrating operation of horizontal position correction error storage means.
Figure 13:
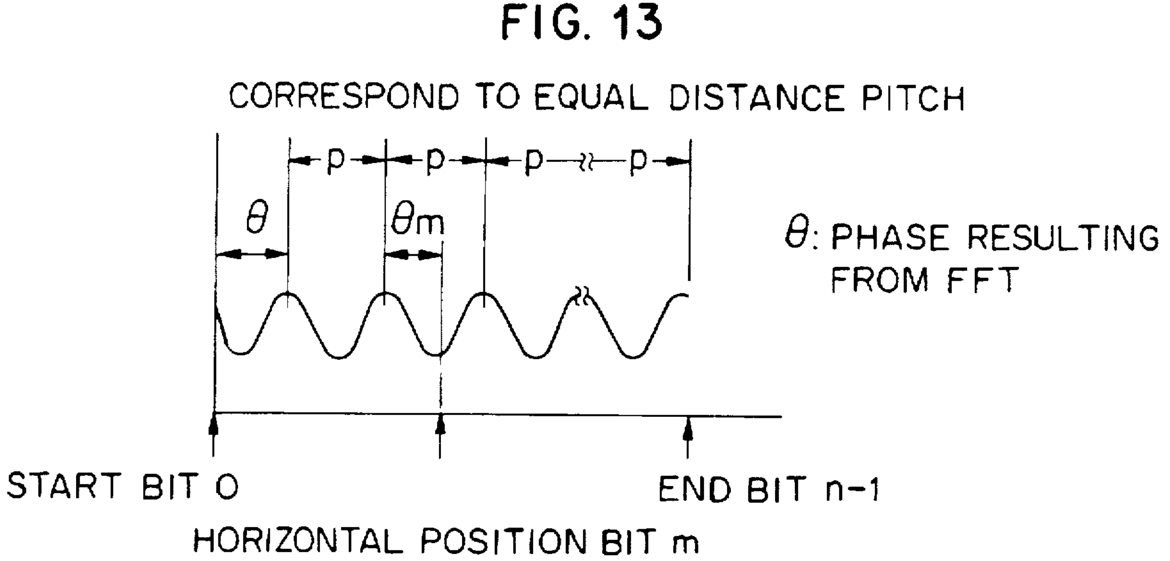
FIG. 13 is a diagram showing a signal corresponding to an equal distance pitch obtained by Fourier transform of a signal obtained from a linear sensor upon long distance measurement.
Figure 15:
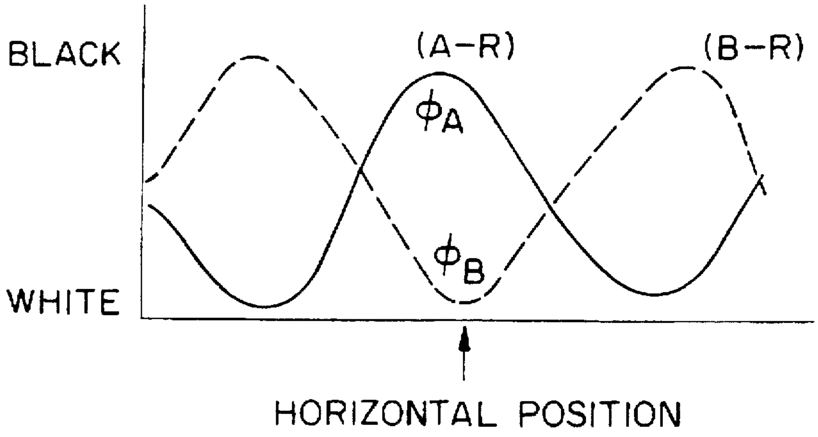
FIG. 15 is a waveform diagram showing signals obtained by processing of the signals shown in FIGS. 14(*a*) and 14(*b*)
Figure 14:
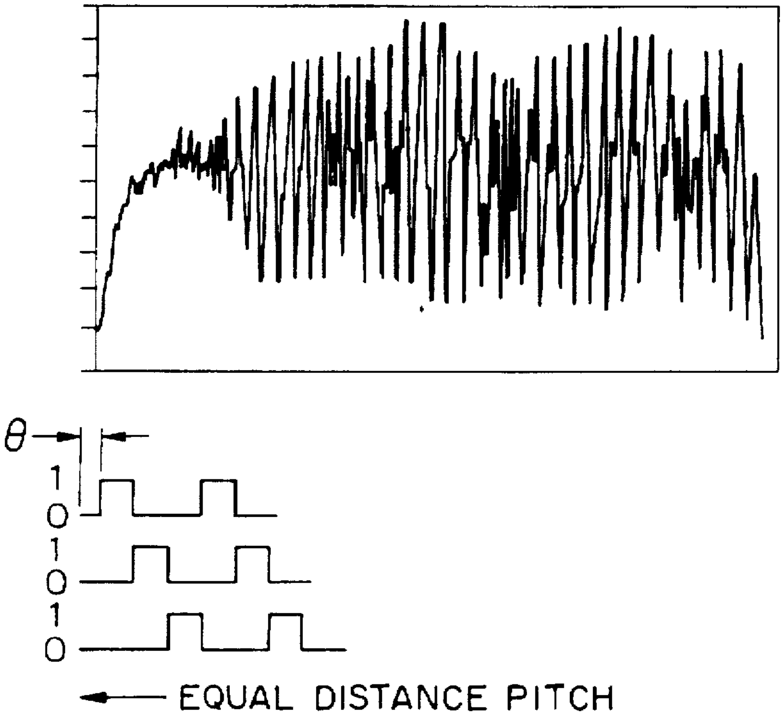
FIGS. 14(*a*) and 14(*b*) are diagrammatic views showing signals obtained by integration and sampling of a reference signal.
Figure 14:
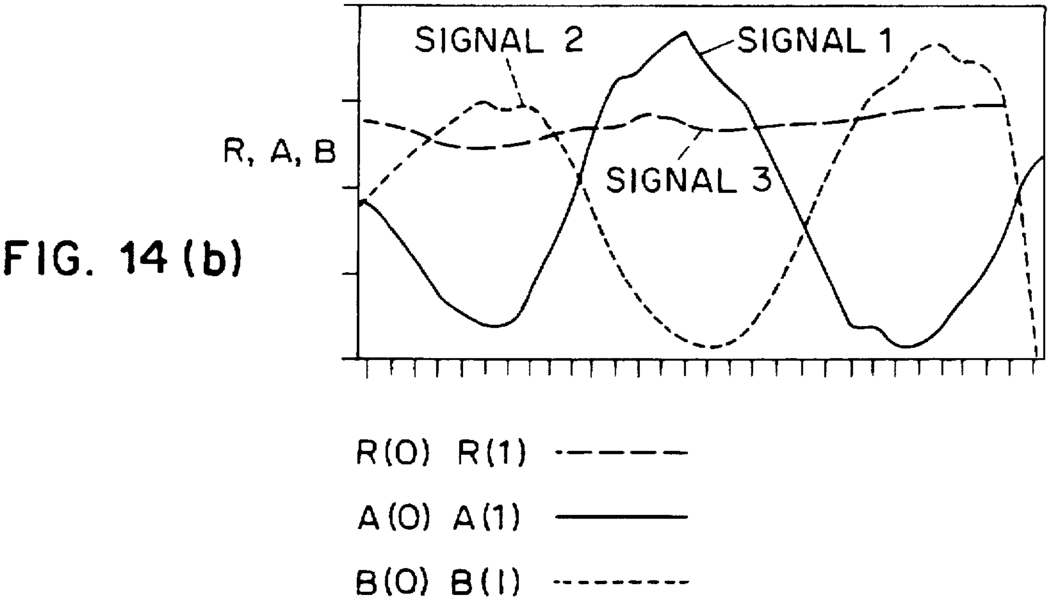
Figure 16:
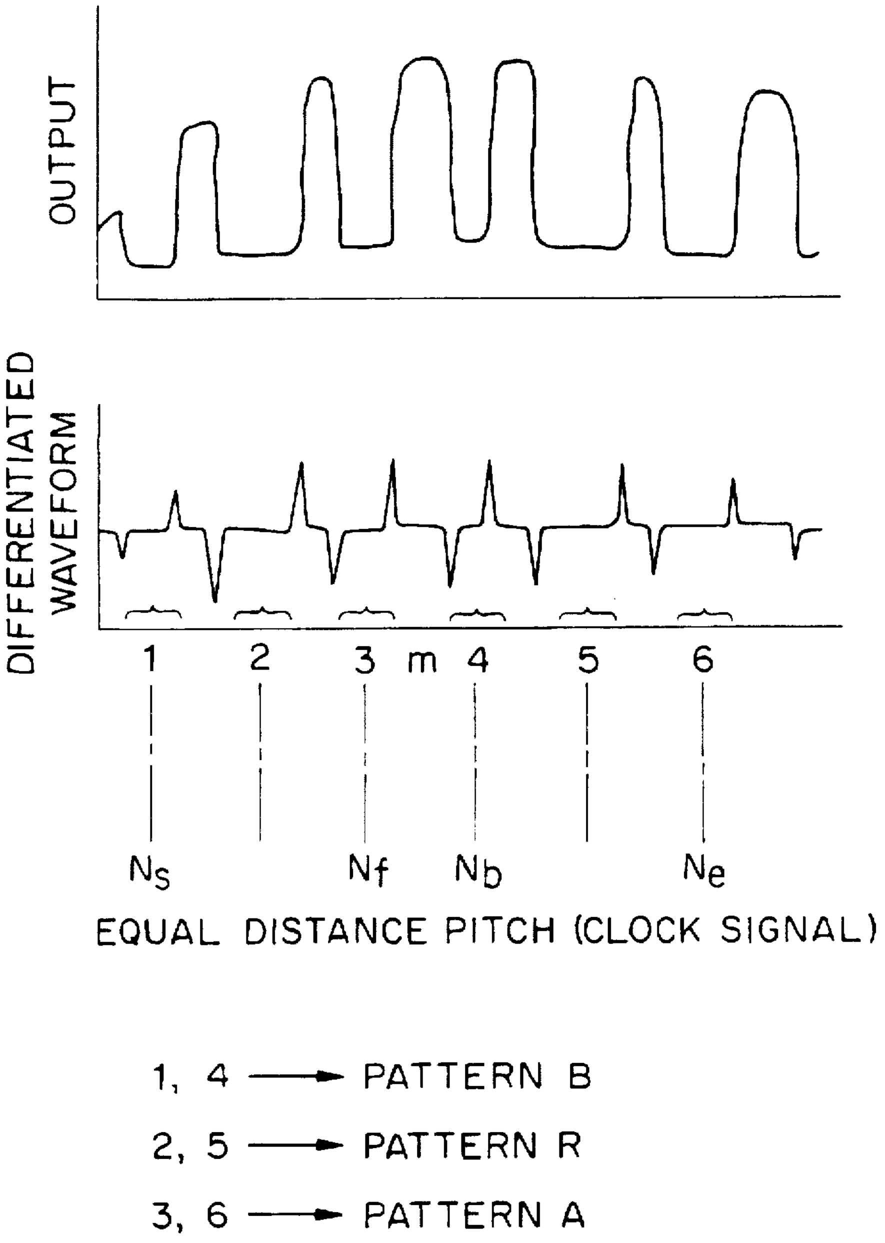
FIGS. 16(*a*) and 16(*b*) are waveform diagram illustrating a method of obtaining reference signals in a short distance measurement.

FIG. 12 is a diagram showing fixed time average inclination angle detection signals $C_{ave}$ where the follow-up property is in a state displaced from an ideal state and in the ideal state. The fixed time average inclination angle detection signal $C_{ave}$ where the follow-up property is not in the ideal state exhibits an increase of the correction amount in proportion to the amount of movement of the compensator 12. It is to be noted that the correction amount may increase in proportion to the movement amount of the compensator 12 or may exhibit a second order variation or some other variation.

Accordingly, in the embodiment described above, the error of the compensator 12 can be corrected based on an error amount of the horizontal position correction error storage means 1677 by calculating an inclination position of an average value. By this method, correction of an inclination with a high degree of accuracy is realized.

It is to be noted that the display unit 167 displays a result of a measurement, and the operation section 550 is manually operated by a user in order to start a measurement.

While the calculation processing means 16 includes the reference signal formation section 1661, pattern signal formation section 1662, block detection section 1663, calculation section 1664, inclination angle data signal formation means 1671, first inclination angle signal storage means 1672, second inclination angle signal storage means 1673, fixed time average inclination angle detection means 1674, photoelectric conversion time average inclination angle detection means 1675, correction amount calculation means 1676 and horizontal position correction error storage means 1677, the other construction wherein the microcomputer 166 executes all of the functions of them may be employed instead.

According to the present invention having the construction described above, a horizontal position error correction mechanism for an electronic level wherein a level rod is collimated to automatically detect a difference of elevation of the level rod is constructed such that it comprises a telescope optical system including a measurement optical system including a photoelectric converter for forming a signal of a pattern of the level rod and a collimation optical system for collimating the level rod, calculation processing means for processing an output signal of the photoelectric converter by calculation, the telescope optical system having compensator means formed thereon for correcting an inclination of the electronic level to maintain a horizontal position of the electronic level, the compensator means including a suspended optical member suspended for rocking motion in forward and backward directions and leftward and rightward directions in response to an inclination of the compensator means, and inclination angle detection means for detecting an inclined angle of the suspended optical member, the calculation processing means calculating an inclination angle data signal of the compensator means based on a detection signal of the inclination angle detection means. Consequently, the horizontal position error correction mechanism for an electronic level of the present invention is advantageous in that the horizontal position error of the electronic level can be corrected eliminating an influence of vibrations of the suspended optical member.

Further, since the correction amount calculation means converts a fixed time average inclination angle detection signal $C_{ave}$ obtained by fixed time average inclination angle detection means and a correction amount obtained from horizontal position correction error storage means into heights to effect correction, the horizontal position correction error of the compensator can be corrected.

Further, since the inclination angle detection means of the horizontal position error correction mechanism for an electronic level of the present invention includes at least a pair of light reception/emission elements and inclination angle data signal formation means of the calculation processing means can calculate the inclination angle data signal of the compensator means from output signals of the light reception elements, the inclination angle data signal can be detected with a high resolution, and besides also the inclination direction can be detected.

Further, the horizontal position error correction mechanism for an electronic level of the present invention is constructed such that the calculation processing means includes first inclination angle signal storage means for fetching and storing the inclination angle data signal of the compensator means for a fixed period of time, and second inclination angle signal storage means for fetching and storing the inclination angle data signal of the compensator means for a period of time while the photoelectric converter measures the light, and the calculation processing means includes fixed time average inclination angle detection means for calculating a fixed time average inclination angle detection signal from the stored data of the first inclination angle signal storage means, photoelectric conversion time average inclination angle detection means for calculating a photoelectric conversion time average inclination angle detection signal from the stored data of the second inclination angle signal storage means, and correction amount calculation means for calculating a difference between the fixed time average inclination angle detection signal and the photoelectric conversion time average inclination angle detection signal and determining an inclination angle corresponding to the difference as a correction amount. Consequently, the horizontal position error correction mechanism for an electronic level of the present invention is advantageous in that the horizontal position error of the electronic level arising from vibrations can be removed in a short time without having a bad influence on a measurement of a height and so forth.

Further, since the horizontal position error correction mechanism for an electronic level of the present invention includes horizontal position correction error storage means, it is advantageous in that the horizontal position correction error of the compensator means can be corrected and a horizontal position measurement can be performed with a high degree of accuracy.

I claim:

1. A horizontal position error correction mechanism for an electronic level wherein a level rod is collimated to automatically detect a difference of elevation of said level rod, comprising a telescope optical system including a measurement optical system including a photoelectric converter for forming a signal of a pattern of said level rod and a collimation optical system for collimating said level rod, calculation processing means for processing an output signal of said photoelectric converter by calculation, said telescope optical system having compensator means formed thereon for correcting an inclination of said electronic level to maintain a horizontal position of said electronic level, said compensator means including a suspended optical member suspended for rocking motion in forward and backward directions and leftward and rightward directions in response to an inclination of said compensator means, and inclination angle detection means for detecting an inclined angle of said suspended optical member, said calculation processing means calculating an inclination angle data signal of said compensator means based on a detection signal of said inclination angle detection means to correct a horizontal position error of said suspended optical member.

2. A horizontal position error correction mechanism for an electronic level according to claim 1, wherein said inclination angle detection means includes a reflection member formed on said suspended optical member, a light emitting element disposed in an opposing relationship to said reflection member for emitting light toward said reflection member, and a light reception element for receiving light emitted from said light emitting element and reflected by said reflection member to detect a light amount of the reflected light which varies in accordance with a magnitude of the inclination of said compensator means, and said calculation processing means includes inclination angle data signal formation means for calculating the inclination angle data signal of said compensator means from an output of said light reception element.

3. A horizontal position error correction mechanism for an electronic level according to claim 1, wherein said inclination angle detection means includes at least a pair of light reception/emission elements, and said calculation processing means includes inclination angle data signal formation means for calculating the inclination angle data signal of said compensator means from output signals of said light reception elements.

4. A horizontal position error correction mechanism for an electronic level according to any one of claims 1 to 3, wherein said calculation processing means includes first inclination angle signal storage means for fetching and storing the inclination angle data signal of said compensator means for a fixed period of time, and second inclination angle signal storage means for fetching and storing the inclination angle data signal of said compensator means for a period of time while said photoelectric converter measures the light, and said calculation processing means includes fixed time average inclination angle detection means for calculating a fixed time average inclination angle detection signal from the stored data of said first inclination angle signal storage means, photoelectric conversion time average inclination angle detection means for calculating a photoelectric conversion time average inclination angle detection signal from the stored data of said second inclination angle signal storage means, and correction amount calculation means for correcting the horizontal position error arising from vibrations based on the fixed time average inclination angle detection signal and the photoelectric conversion time average inclination angle detection signal.

5. A horizontal error correction mechanism for an electronic level according to claim 4, wherein the fixed time is longer than a period of a characteristic frequency of said compensator means but shorter than a measurement time of said electronic level, and the photoelectric conversion time is started at least after lapse of an optimum exposure time measurement time of said photoelectric converter from a start point of the fixed time.

6. A horizontal error correction mechanism for an electronic level according to claim 4, wherein said correction amount calculation means corrects the horizontal position of said electronic level not based on the fixed time average inclination angle detection signal and the photoelectric conversion time average inclination angle detection signal but instead based on detection signals of horizontal position correction error storage means of said compensator means and the fixed time average inclination angle detection signal measured and stored in advance.

7. A horizontal error correction mechanism for an electronic level according to claim 4, wherein said correction amount calculation means corrects the horizontal position of said electronic level not based on the fixed time average inclination angle detection signal and the photoelectric conversion time average inclination angle detection signal but instead based on detection signals of horizontal position correction error storage means of said compensator means and the fixed time average inclination angle detection signal measured and stored in advance and the photoelectric conversion time average angle detection signal.

* * * * *